United States Patent
Karin et al.

(10) Patent No.: US 12,401,661 B2
(45) Date of Patent: Aug. 26, 2025

(54) DETECTING NETWORK ACTIVITY FROM SAMPLED NETWORK METADATA

(71) Applicant: Microsoft Technology Licensing, LLC, Redmond, WA (US)

(72) Inventors: Omer Karin, Tel Aviv (IL); Idan Y. Hen, Tel Aviv (IL); Roy Levin, Haifa (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 17/004,435

(22) Filed: Aug. 27, 2020

(65) Prior Publication Data

US 2022/0067484 A1 Mar. 3, 2022

(51) Int. Cl.
| | | |
|---|---|---|
| *G06N 3/04* | (2023.01) | |
| *G06N 3/08* | (2023.01) | |
| *H04L 9/40* | (2022.01) | |
| *H04L 12/26* | (2006.01) | |
| *H04L 29/06* | (2006.01) | |
| *H04L 43/08* | (2022.01) | |
| *H04L 69/22* | (2022.01) | |

(52) U.S. Cl.
CPC .............. *H04L 63/12* (2013.01); *H04L 43/08* (2013.01); *H04L 69/22* (2013.01)

(58) Field of Classification Search
CPC ................................. H04L 69/22; H04L 43/08
See application file for complete search history.

(56) References Cited

U.S. PATENT DOCUMENTS

| | | | | |
|---|---|---|---|---|
| 8,065,721 | B1* | 11/2011 | Shah | H04L 63/0263 726/13 |
| 10,412,105 | B2* | 9/2019 | Sofka | G06N 3/044 |
| 11,301,778 | B2* | 4/2022 | Pastor Perales | G06N 20/00 |
| 11,616,798 | B2* | 3/2023 | Achleitner | H04L 63/1425 726/23 |
| 11,621,899 | B1* | 4/2023 | Bettaiah | H04L 43/08 709/224 |
| 2019/0294995 | A1* | 9/2019 | Pastor Perales | G06N 20/00 |

(Continued)

FOREIGN PATENT DOCUMENTS

CN 110532564 A 12/2019

OTHER PUBLICATIONS

Bachl et al. "SparseIDS: Learning Packet Sampling with Reinforcement Learning", IEEE Conference on Comm'ns and Network Security (CNS) p. 1-9, Jun. 29, 2020 [retrieved on Aug. 22, 2022]. DOI: 10.1109/CNS48642.2020.9162253. Retrieved from the Internet: <URL: https://ieeexplore.ieee.org/document/9162253>. (Year: 2020).*

(Continued)

*Primary Examiner* — Nazia Naoreen
(74) *Attorney, Agent, or Firm* — Schwegman Lundberg & Woessner, P.A.

(57) ABSTRACT

Generally discussed herein are devices, systems, and methods for cloud traffic monitoring. A method can include receiving sampled network metadata of a packet transmitted via a computer network, providing the sampled network metadata to a neural network (NN) trained on labeled sampled network metadata, and providing, based on only the sampled network metadata, a classification for the sampled network metadata via the trained neural network.

17 Claims, 6 Drawing Sheets

(56) References Cited

U.S. PATENT DOCUMENTS

| | | | |
|---|---|---|---|
| 2020/0067935 A1* | 2/2020 | Carnes, III | H04L 63/101 |
| 2020/0117523 A1* | 4/2020 | Morrison | G06F 9/547 |
| 2020/0236131 A1* | 7/2020 | Vejman | H04L 63/145 |
| 2020/0272859 A1* | 8/2020 | Lashyn | G06F 18/217 |
| 2021/0256156 A1* | 8/2021 | Enuka | G06F 21/6245 |
| 2022/0004897 A1* | 1/2022 | Jadon | G06N 3/084 |

OTHER PUBLICATIONS

Wang et al. "A Framework for QoS-aware Traffic Classification Using Semi-supervised Machine Learning in SDNs", 2016 IEEE Int'l Conf'n on Services Computing, Jun. 30, 2016. DOI: 10.1109/SCC.2016.133. (Year: 2016).*

Lee, Nicholas, et al., "Study of long short-term memory in flow-based network intrusion detection system", In Journal of Intelligent & Fuzzy Systems, vol. 35, Issue 6, Jan. 1, 2018. 5947-5957.

Lopez-Martin, et al., "Network Traffic Classifier With Convolutional and Recurrent Neural Networks for Internet of Things", In Proceedings of IEEE Access, vol. 5, Sep. 6, 2017, pp. 18042-18050.

"International Search Report and Written Opinion Issued in PCT Application No. PCT/US2021/034123", Mailed Date: Aug. 31, 2021, 11 Pages.

Rezaei, et al., "Large-Scale Mobile App Identification Using Deep Learning", In Proceedings of IEEE Access, vol. 8, Dec. 24, 2019, pp. 348-362.

* cited by examiner

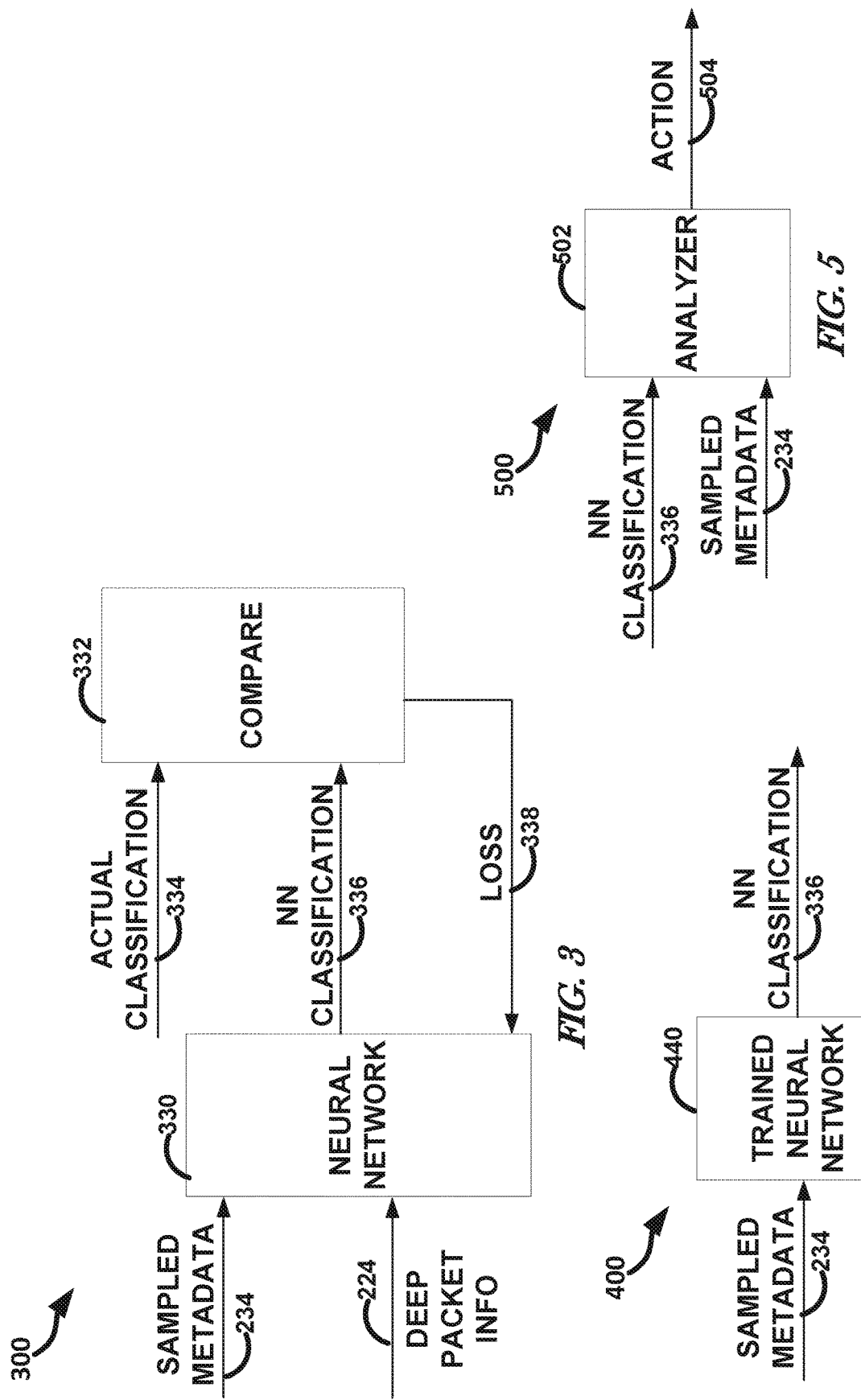

DETECTING NETWORK ACTIVITY FROM SAMPLED NETWORK METADATA

BACKGROUND

If an organization wants to provide access to secure cloud applications, it can monitor deep packet information. Monitoring deep packet information includes inspecting an entire packet, including the header and payload. The deep packet information is different from conventional packet filtering which examines only packet headers. Deep packet inspection is typically performed as a firewall feature at the application layer of the Open Systems Interconnection (OSI) reference model. Deep packet inspection can be used to detect and intercept viruses and other forms of malicious traffic. Deep packet inspection has privacy issues in that an originator and a recipient of content can be identified using deep packet inspection. The existence of secure socket layer (SSL) interception, in which encrypted traffic is intercepted, decrypted, and analyzed, only increases these concerns.

Deep packet information can be overwhelmingly large and it can be difficult to sift through all deep packet information or even a subset of the packets of deep packet information. Further, deep packet inspection can create new vulnerabilities, such as buffer overflow attacks, denial-of-service (DOS) attacks, and some types of malware. Further yet, deep packet inspection software requires its own periodic updates and revisions to remain optimally effective. Even further yet, deep packet inspection reduces network speed, because it increases the burden on network processors.

In a cloud setting, a provider generally does not like to give a customer access to network traffic within the multi-customer platform because of the risk of customer-to-customer data transfer or data leaks. The cloud provider can effectively encapsulate the deep packet information to separate the customer and management data flows. This often means that deep packet inspection technologies can have trouble processing cloud traffic as the deep packet inspection technologies are not typically privy to the encapsulation techniques and how to de-encapsulate the packets.

SUMMARY

This summary section is provided to introduce aspects of embodiments in a simplified form, with further explanation of the embodiments following in the detailed description. This summary section is not intended to identify essential or required features of the claimed subject matter, and the combination and order of elements listed in this summary section are not intended to provide limitation to the elements of the claimed subject matter.

Systems, methods, device, and computer or other machine-readable media can provide improvements over prior cloud provisioning solutions. The improvements can include classifying network behavior based on sampled network metadata (only sampled network metadata). The improvements can include reducing memory and compute bandwidth overhead required as compared to prior network behavior monitoring techniques. The improvements can further include reduction of man-in-the-middle time used to identify malignant network behavior.

A method, device, computer-readable medium, a means for, and system for network behavior monitoring are provided. The method, device, computer-readable medium, means for, or system can be configured to receive sampled network metadata of a packet transmitted via a computer network, provide the sampled network metadata to a neural network (NN) trained on labeled sampled network metadata, and provide, based on only the sampled network metadata, a classification for the sampled network metadata via the trained neural network.

The device can include processing circuitry, a memory including instructions that when executed by the processing circuitry cause the processing circuitry to perform operations, or other circuitry. The device can include a router, switch, firewall, or client device.

The NN can be trained further based on contents of the packet and the label is an actual classification associated with the contents of the packet and associated sampled network metadata. The actual classification can be determined using deep packet inspection. The NN can be a recurrent NN. The NN can include a bi-directional long short term memory (LSTM) NN.

The sampled network metadata can from network traffic provided over layer three of the computer network. The actual classification can include one or more of a user authentication, a device authentication, a database query, file transfer, data streaming, or a malicious action.

BRIEF DESCRIPTION OF DRAWINGS

FIG. 3 illustrates, by way of example, a conceptual block diagram of a system for training a neural network (NN) to classify based on the sampled metadata.

FIG. 4 illustrates, by way of example, a conceptual block diagram of an embodiment of a system for using the NN after training.

FIG. 5 illustrates, by way of example, a conceptual block diagram of an embodiment of computer network traffic analysis system.

DETAILED DESCRIPTION

Figure 1:
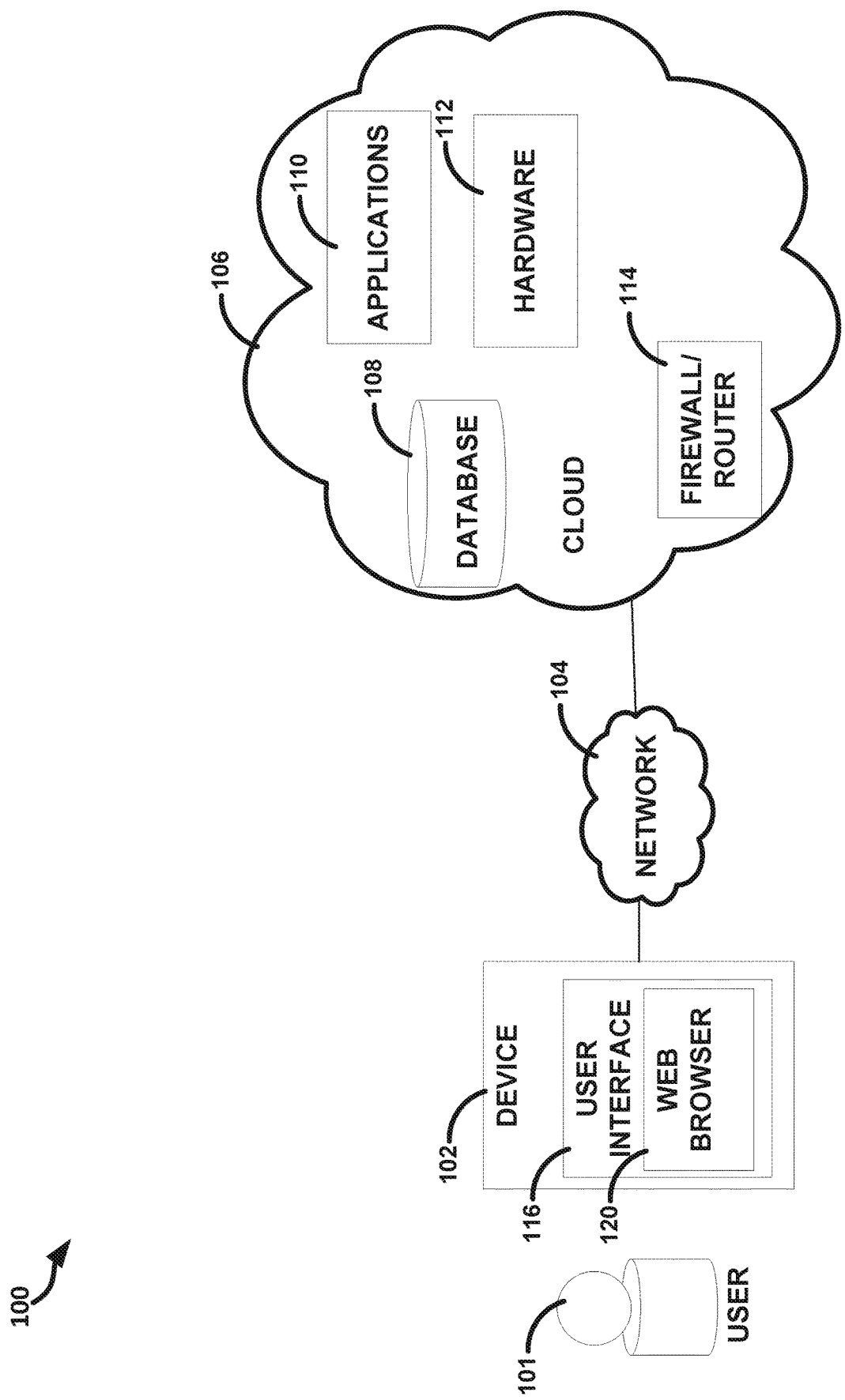
FIG. 1 illustrates, by way of example, a diagram of an embodiment of a cloud resource provisioning system.

In the following description, reference is made to the accompanying drawings that form a part hereof, and in which is shown by way of illustration specific embodiments which may be practiced. These embodiments are described in sufficient detail to enable those skilled in the art to practice the embodiments. It is to be understood that other embodiments may be utilized and that structural, logical, and/or electrical changes may be made without departing from the scope of the embodiments. The following description of embodiments is, therefore, not to be taken in a limited sense, and the scope of the embodiments is defined by the appended claims.

The operations, functions, or techniques described herein may be implemented in software in some embodiments. The software may include computer executable instructions stored on computer or other machine-readable media or storage device, such as one or more non-transitory memories (e.g., a non-transitory machine-readable medium) or other type of hardware-based storage devices, either local or networked. Further, such functions may correspond to subsystems, which may be software, hardware, firmware or a combination thereof. Multiple functions may be performed in one or more subsystems as desired, and the embodiments described are merely examples. The software may be executed on a digital signal processor, application specific integrated circuitry (ASIC), microprocessor, central processing unit (CPU), graphics processing unit (GPU), field programmable gate array (FPGA), or other type of processor operating on a computer system, such as a personal computer, server or other computer system, turning such computer system into a specifically programmed machine. The functions, operations, or methods may be implemented using processing circuitry, such as may include electric and/or electronic components (e.g., one or more transistors, resistors, capacitors, inductors, amplifiers, modulators, demodulators, antennas, radios, regulators, diodes, oscillators, multiplexers, logic gates (e.g., AND, OR, XOR, negate, or the like), buffers, caches, memories, GPUs, CPUs, FPGAs, ASICs, or the like).

It is quite difficult to provide network security in the cloud. It is even more difficult to preserve privacy, maintain network bandwidth, and not consume too many compute resources (e.g., firewall, gateway, router, switch, or the like), while providing network security. The network security is often provided using deep packet inspection, which neither provides privacy, maintains network bandwidth, nor consumes a small number of compute resources, as previously discussed in the background.

Cloud providers have yet to develop an efficient technique for the detection of malicious activity that can scale to millions of customers. One way to do this is to make use of network data, since most attacks have a network component, usually at multiple stages of the kill chain. However, the detection of malicious activity over network data is challenging, since network data consumes a large volume of memory and analysis of the large volume of data is time and resource intensive.

Sampled network metadata, discussed in more detail elsewhere, is typically useful for detection of volumetric attacks with a clear metadata signature (such as a SYN flooding denial of service (DoS) attack). Other attacks, which involve a volumetric component, have a less apparent metadata signature. For example, the transfer of a payload, or data exfiltration over some network protocol, may be observable in sampled metadata, but it is unclear how to distinguish these payload transfer or data exfiltration from other traffic.

Embodiments provide a supervised-learning based approach for detecting network features that typically require deep packet information (such as whether a file transfer or streaming occurred) from sampled network metadata. The approach is based on training a recurrent machine learning (ML) model (for example, a bidirectional LSTM) that translates between sampled network metadata, and classifies based on the corresponding network traffic. This can be done on publicly available datasets that include both network metadata and corresponding deep packet information. The model can then be used to detect network features that are typically only evident from deep packet inspection but based on only sampled network metadata.

The model can be useful beyond the security domain and can be extended to other domains that rely on sampled network metadata. One such application is to monitor resource usage patterns (e.g., file transfers, streaming, etc.) from sampled network activity, without installing an agent and without deep packet inspection. Embodiments can provide such efficient monitoring at scale.

Inferring network activity patterns from sampled network metadata is a difficult problem that can be beneficial for security applications. A model can be trained to identify normal ("benign") patterns of network activity. These patterns are abundant and robust in publicly available datasets so the trained model is able to robustly classify the normal patterns. The model can then be used to translate between the sampled metadata and the actual underlying network activity patterns, making it applicable to various classification, monitoring, and detection tasks.

Embodiments can provide advantages, such as: 1) providing advantages of deep packet inspection without requiring all information of the deep packets, 2) performing operations of deep packet inspection without compromising privacy, 3) performing operations of deep packet inspection with fewer compute resources. Embodiments can provide these advantages by training a neural network (NN) based on deep packet inspection information, sampled metadata, and corresponding classifications determined based on the deep packet inspection. The NN can then be deployed to operate on only the sampled metadata to identify network operations.

FIG. 1 illustrates, by way of example, a diagram of an embodiment of a cloud application system 100. The system 100 provides a user 101 with access to functionality of applications, hardware, or data hosted remote to the user 101, in "the cloud" 106. The user 101 can access the functionality or data of the cloud 106 using a device 102. The device 102 can include a user interface 116. The user interface 116 provides the user 101 with access to functionality of the device 102. A web browser 120, accessible through the user interface 116, can allow the user 101 access to applications, hardware, data, or the like that is hosted on a network remote to the device 102. The web browser 120 can be used to request access to the functionality of the cloud 106, such as through the network 104, sometimes called the Internet.

The network 104 is a series of routers, switches, hubs, or the like, connected to other networks, such as the cloud 106, or user devices. The network 104 can be the medium through which the device 102 gains access to functionality the user 101 desires but may not have access to locally.

The cloud 106, as illustrated, includes a database 108, applications 110, hardware 112, and network circuitry (illustrated as a firewall/router 114). The database 108 includes data, such as a file, webpage, text, image, video, audio, a combination thereof, or the like. The database 108 can be accessed through permissions enforced by the firewall/router 114 or other network circuitry.

The applications 110 include software functionality. The applications 110 can perform operations of software, which can include accessing data in the database 108, functionality of the hardware 112, or the like. The applications 110 can perform any operations that can be performed by a computer, cluster of computers or processors, or the like.

The hardware 112 can include one or more computers, a cluster of computers, a data server, one or more graphics processing units (GPUs), field programmable gate arrays (FPGAs), application specific integrated circuits (ASICs), central processing units (CPUs), or the like. An application 110 can operate on the hardware 112, such as to operate as a virtual machine.

The firewall/router 114 can implement security controls for the cloud 106. Security controls can be defined by an administrator. The security controls can define devices that are allowed access to resources (e.g., the database 108, applications 110, or hardware 112) of the cloud 106 and the resources, or portions thereof, to which the devices are allowed access. The security controls can include password or other authentication information that is required to be provided before the device is allowed access to the resource.

The firewall/router 114 can monitor traffic therethrough. The firewall/router 114 can implement a neural network (NN) configured to classify the traffic into normal activity classifications (e.g., file access, application access, hardware access) and unknown activity classification (e.g., potentially malicious activity). The NN can classify the traffic based on sampled traffic metadata. Sample traffic metadata is explained in more detail regarding FIG. 2.

Figure 2:
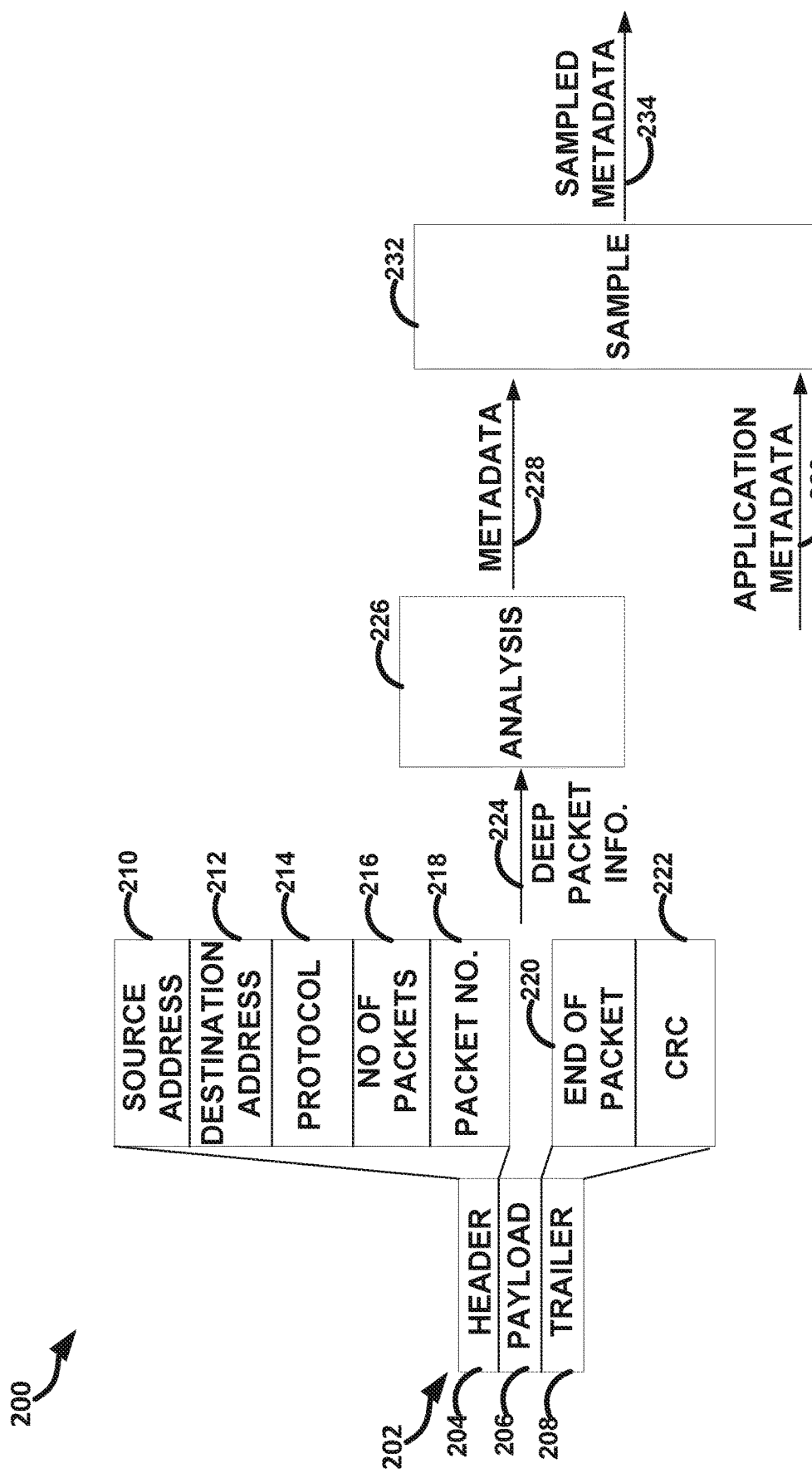
FIG. 2 illustrates, by way of example, a diagram of an embodiment of a system for generating sampled network metadata.

FIG. 2 illustrates, by way of example, a diagram of an embodiment of a system 200 for generating sampled network metadata 228. The system 200, as illustrated, includes a packet 202, an analysis operation 226, and a sample operation 232. The packet 202 typically includes a header 204, a payload 206, and a trailer 208. The header 204 generally indicates an source address 210 of a device that originated the packet 202, a destination address 212 of a device to receive the payload 206 of the packet 202, a protocol 214 to be used in transferring the packet 202 between devices, a number of packets 216 related to a total payload (of which the payload 206 is at least a part), and a packet number 218 that indicates, of the number of packets indicated by the number of packets 216, which the packet 202 corresponds to. The payload 206 is at least a portion of the data to be transmitted to the destination device. The trailer 208 indicates an end of the packet 220 so that devices can determine where one packet ends and another packet begins. The trailer 208 can include a cyclic redundancy check (CRC) 222 that allows for error checking on the header, payload, trailer, or a combination thereof.

The entire packet 202 is sometimes called deep packet information 224. To perform security analysis (not to be confused with the analysis operation 226) on the deep packet information 224 is prohibitively expensive in terms of compute resources, memory consumed, and network bandwidth consumed. Security analysis on the deep packet information 224 slows down data transmission, as the data transmitted is either stalled while analysis is performed or is copied and then transmitted before analysis is performed.

The analysis operation 226 can generate metadata 228 based on the deep packet information 224. Programs like Netflow and Internet Protocol version 6 can perform such analysis on the deep packet information 224. The metadata 228 describes the data of the deep packet information 224. The metadata 228 can include capture of information, such as source address 210 or destination address 212, protocol 2114, source and destination transmission control protocol (TCP)/user datagram protocol (UDP) ports, service (associated application 110), time/date stamps, data quantity, or a combination thereof. Examples of programs or protocols to generate the metadata 228 include NetFlow, Argus, App Flow, JStream, JFLOW, among others. The analysis operation 226 can be performed by a switch, packet broker, router, firewall, or the like. Note the packet 202 is transmitted over layer three of the OSI infrastructure.

Application metadata 230, in contrast to network data, is transmitted over layer 7 of the OSI architecture. Application metadata 230 can be generated in a manner similar to the packet metadata 228, but based on application operation information (e.g., ports accessed, data requested, a device that is the subject of the data request, or the like).

The sample operation 232 can reduce the totality of the metadata 228 to a subset of the metadata 228. The sample operation 232 can be a uniform or non-uniform sampling. Sampling means keeping only a portion of the metadata 228. Sampling can include retaining metadata of every other packet, every third packet, every fourth packet, every fifth packet, . . . every tenth packet, . . . every hundredth packet, . . . every thousandth packet, . . . etc., every two out of three packets, . . . or some other sampling rate therebetween. The metadata 228 retained after the sampling operation is the sampled metadata 234. At this point, the deep packet information 224 has been reduced to metadata 228 and reduced again to sampled metadata 234. This greatly reduces the data burden for traffic analysis.

FIG. 3 illustrates, by way of example, a conceptual block diagram of a system 300 for training an NN 330 to classify network traffic based on only the sampled metadata 234. The system 300, as illustrated, includes the NN 330. The NN 330 receives the sampled metadata 234 and the deep packet information 224 as input. The NN 330 determines a classification 336 based on the input. An actual classification 334 for the deep packet information 224 is compared to the NN classification 336 at operation 332. The deep packet information 224 and the actual classification 334 of the deep packet information 224 are publicly available. The sampled metadata 234 can be determined using the analysis operation 226 and the sample operation 332 of FIG. 2. The deep packet information 224, sampled metadata 234, and actual classification 334 can form the training data set. Generally, the more training data used, the more accurate the NN 330 can operate after deployment. Initial parameters of the NN 330 can be guessed or set to a random value and adjusted through backpropagation.

A difference between the actual classification 334 and the NN classification 336 can define a loss 338. The loss 338 can be determined as a least absolute error, least squared error, hinge loss, logistic loss, or the like. The loss 338 can be backpropagated to the NN 330 to adjust parameters of the neurons of the NN 330. The classification performed on the sampled metadata 234 can label the sampled metadata 234 with actions previously only detected based on inspection of the deep packet information 224.

The NN 330 can include bidirectional long short term memory (LSTM) gates, gated recurrent units (GRUs), or the like. Details of bidirectional LSTMs are described in more detail regarding FIG. 5.

FIG. 4 illustrates, by way of example, a conceptual block diagram of an embodiment of a system 400 for using the NN 330 after training. The NN 440 represents the NN 330 after training. The NN 440 can classify network traffic based on only the sampled metadata 234. The manner in which the NN 440 was trained, as discussed with FIG. 3, embeds knowledge of the deep packet information 224 associated with the sampled metadata 234 into the gates or units of the NN 440. The NN 440, however, does not require the deep packet information. 224 to accurately make the classification 336. The NN 440 can operate using only the sampled metadata 234 to generate the classification 336.

The classification 336 can include a network traffic action as the label for the sampled metadata 234. The classification can include device authentication, user authentication, querying a database, brute force attack, volumetric attack, accessing an application, transferring a file, streaming data, or the like. Examples of classifications that are typically determined based on the deep packet information 224 include device authentication, user authentication, querying a database, brute force attack, accessing an application, transferring a file, and streaming data. The sampled metadata 234 can be provided along with the NN classification 336 to an analyzer. The analyzer can determine whether to act based on the sampled metadata 234 and/or the classification 336.

FIG. 5 illustrates, by way of example, a conceptual block diagram of an embodiment of an analysis system 500. The analysis system 500 as illustrated includes an analyzer 502 that receives the NN classification 336 and optionally the sampled metadata 334. The analyzer 502 can include a software program, hardware such as electric or electronic components configured to perform operations of the analyzer 502, a subject matter expert (SME), a combination thereof, or the like. The analyzer 502 can determine, based on the NN classification 336 and/or the sampled network metadata 334 if and what action 504 is to be performed to help mitigate the malware attack. The analyzer 502, for example, can determine that the NN classification 336 indicates that a malware attack is being performed by a text message, email, an icon on a display (e.g., flashing, color encoded, annotated, or the like), a sound, or the like. The malware attack can be indicated by a variety of patterns in the NN classification 336 and/or sample network metadata 224. For example, a data exfiltration following a successful brute force attack, an anomalous downloading or uploading of certain file types (e.g., a portable data format (pdf) download from websites where most downloads are of image files, or the like), a file upload from an unauthorized user, among many others.

Figure 6:
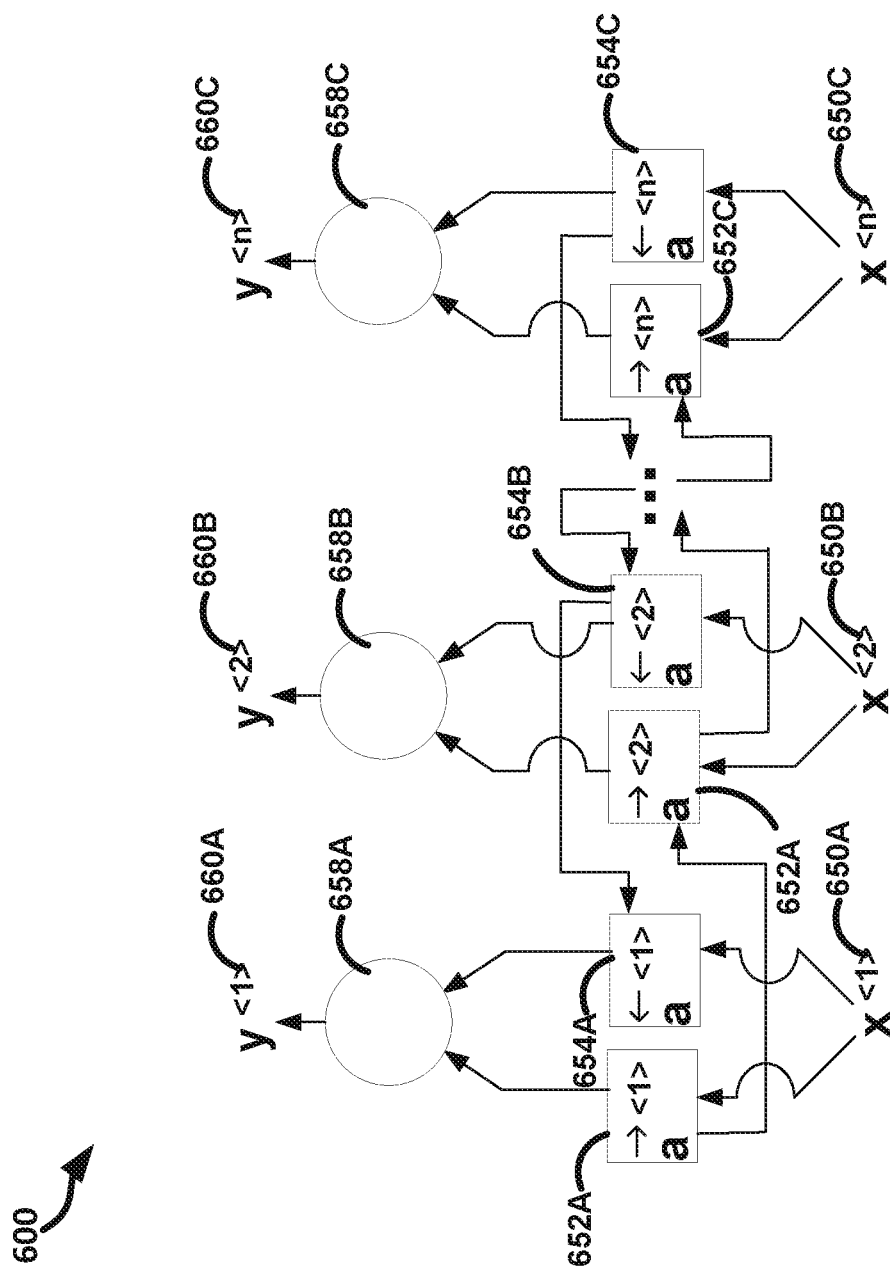
FIG. 6 illustrates, by way of example, a conceptual block diagram of an embodiment of an LSTM NN.

FIG. 6 illustrates, by way of example, a conceptual block diagram of an embodiment of an LSTM NN 600. The LSTM NN 600 receives input 650A, 650B, 650C and produces hidden feature values 660A, 660B, 660B based on the input 650A-650C. The input 650A-650C in training can include the sampled metadata 234 and the deep packet information 224, features thereof, or an embedded version thereof, such as during training. The input 650A-650C during runtime can include just the sampled metadata 234, features of the sampled metadata 234, a word embedding of the sampled metadata 234, or a combination thereof.

The input 650A-650C can be provided to forward encoding neurons 652A, 652B, 652C and backward encoding neurons 654A, 654B, 654C. The forward encoding neurons 652A-652C can encode the neurons in order from least significant unit (input 650A) to most significant unit (input 650C). The forward encoding neuron 652A encodes the input 650A and provides the encoding to the forward encoding neuron 654A and a combination operation 658A. The forward encoding neuron 654A encodes based on both the encoding from the forward encoding neuron 652A and the input 650B and provides the determined encoding to the next forward encoding neuron in the sequence and the combination operation 658B. The process continues until a final forward encoding neuron 656A which encodes based on an encoding of all prior input 650A, 650B, etc. and provides the determined encoding to just the combination operation 658C.

The backward encoding neurons 654A-654C operate similar to the forward encoding neurons 652A-652C but encode in reverse order through the input 650A-650C. Thus, the input 650C is encoded first by the backward encoding neuron 654C and the encoding is provided to both the combination operation 658C and a next backward encoding neuron. The backward encoding neurons 654A-654C continue to operate on the input in reverse order until the backward encoding neuron 654A encodes based on the encoding from the backward encoding neuron 654B and the input 650A.

The combination operation 658A, 658B, 658C can include an addition, multiplication, average, concatenation, or the like. The output 660A, 660B, 660C is thus a combination of the encoding of the input 650A-650C in the forward direction (from the forward encoding neurons 652A-652C) and the backward direction (from the backward encoding neurons 654A-654C). The output 660A-660C can then be used for classification. The bi-directional LSTM NN 600 is thus trained to embed deep packet information 224 knowledge into the sample metadata 234 for determining the classification 336.

Figure 7:
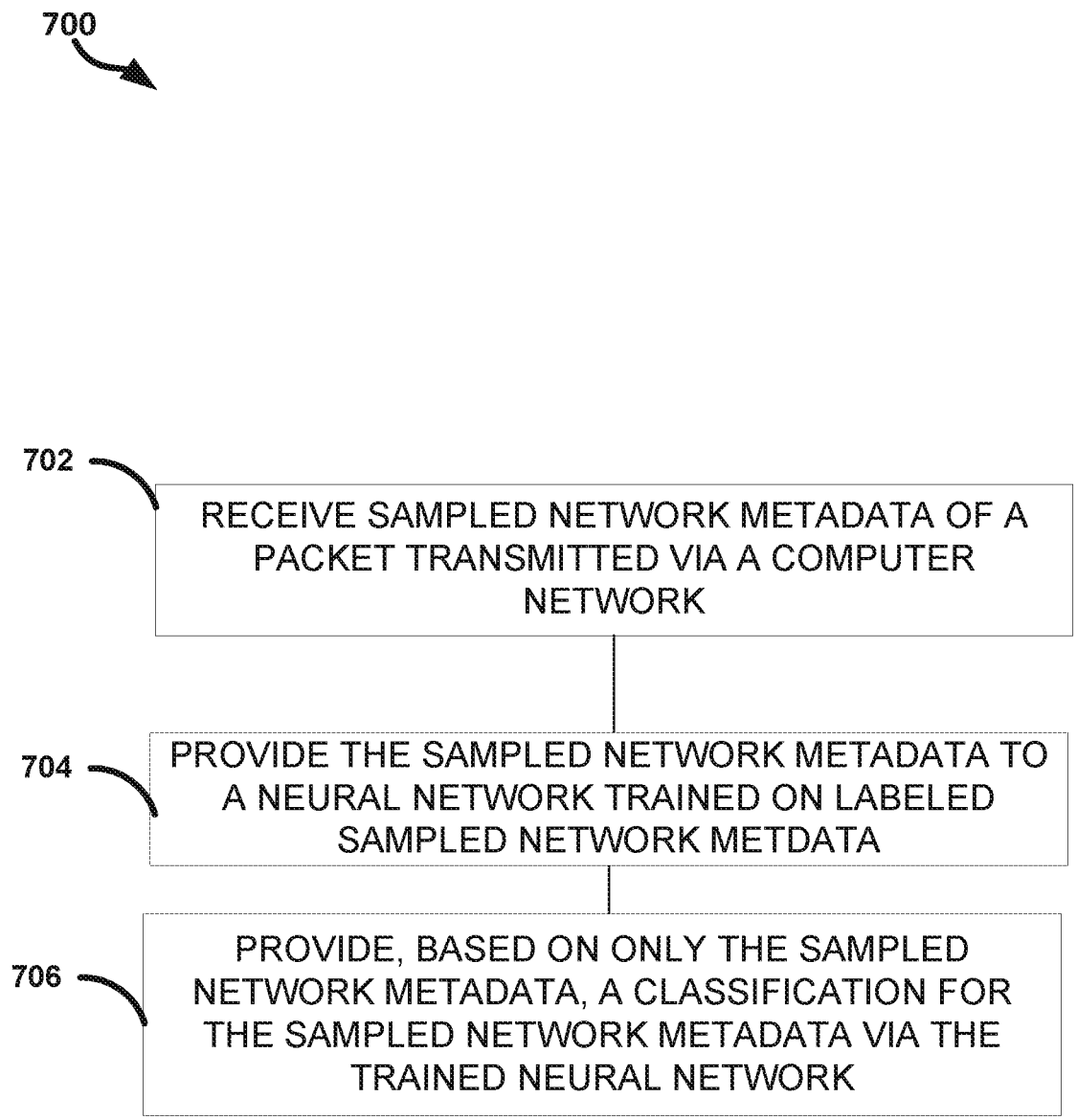
FIG. 7 illustrates, by way of example, a flow diagram of an embodiment of a method for cloud security.

FIG. 7 illustrates, by way of example, a flow diagram of an embodiment of a method 700 for cloud security. The method 700 can be performed by one or more of the components of FIGS. 1-6, such as the firewall/router 114 or a different device of the network 104, the cloud 106, or a device coupled therebetween. The method 700 can include receiving (at processing circuitry of a device) sampled network metadata of a packet transmitted via a computer network, at operation 702; providing, by the processing circuitry, the sampled network metadata to a neural network (NN) trained on labeled sampled network metadata, at operation 704; and providing, based on only the sampled network metadata, a classification for the sampled network metadata via the trained neural network, at operation 706.

The method 700 can further include, wherein the NN is trained further based on contents of the packet and the label is an actual classification associated with the contents of the packet and associated sampled network metadata. The method 700 can further include, wherein the actual classification is determined using deep packet inspection. The method 700 can further include, wherein the NN is a recurrent NN. The method 700 can further include, wherein the NN includes a bi-directional long short term memory (LSTM) NN.

The method 700 can further include, wherein the sampled network metadata is of network traffic provided over layer three of the computer network. The method 700 can further include, wherein the actual classification includes one of a user authentication, a device authentication, a database query, file transfer, data streaming, or a malicious action.

Electric or electronic components of the device 102, network 104, cloud 106, or other device or circuitry can include one or more transistors, resistors, capacitors, inductors, amplifiers, modulators, demodulators, antennas, radios, regulators, diodes, oscillators, multiplexers, logic gates (e.g., AND, OR, XOR, negate, or the like), buffers, caches, memories, GPUs, CPUs, FPGAs, ASICs, or the like.

Artificial intelligence (AI) is a field concerned with developing decision-making systems to perform cognitive tasks that have traditionally required a living actor, such as a person. Neural networks (NNs) are computational structures that are loosely modeled on biological neurons. Generally, NNs encode information (e.g., data or decision making) via weighted connections (e.g., synapses) between nodes (e.g., neurons). Modern NNs are foundational to many AI applications, such as speech recognition.

Many NNs are represented as matrices of weights that correspond to the modeled connections. NNs operate by accepting data into a set of input neurons that often have many outgoing connections to other neurons. At each traversal between neurons, the corresponding weight modifies the input and is tested against a threshold at the destination neuron. If the weighted value exceeds the threshold, the value is again weighted, or transformed through a nonlinear function, and transmitted to another neuron further down the NN graph—if the threshold is not exceeded then, generally, the value is not transmitted to a down-graph neuron and the synaptic connection remains inactive. The process of weighting and testing continues until an output neuron is reached; the pattern and values of the output neurons constituting the result of the ANN processing.

The correct operation of most NNs relies on accurate weights. However, NN designers do not generally know which weights will work for a given application. NN designers typically choose a number of neuron layers or specific connections between layers including circular connections. A training process may be used to determine appropriate weights by selecting initial weights. In some examples, the initial weights may be randomly selected. Training data is fed into the NN and results are compared to an objective function that provides an indication of error. The error indication is a measure of how wrong the NN's result is compared to an expected result. This error is then used to correct the weights. Over many iterations, the weights will collectively converge to encode the operational data into the NN. This process may be called an optimization of the objective function (e.g., a cost or loss function), whereby the cost or loss is minimized.

A gradient descent technique is often used to perform the objective function optimization. A gradient (e.g., partial derivative) is computed with respect to layer parameters (e.g., aspects of the weight) to provide a direction, and possibly a degree, of correction, but does not result in a single correction to set the weight to a "correct" value. That is, via several iterations, the weight will move towards the "correct," or operationally useful, value. In some implementations, the amount, or step size, of movement is fixed (e.g., the same from iteration to iteration). Small step sizes tend to take a long time to converge, whereas large step sizes may oscillate around the correct value or exhibit other undesirable behavior. Variable step sizes may be attempted to provide faster convergence without the downsides of large step sizes.

Backpropagation is a technique whereby training data is fed forward through the NN—here "forward" means that the data starts at the input neurons and follows the directed graph of neuron connections until the output neurons are reached—and the objective function is applied backwards through the NN to correct the synapse weights. At each step in the backpropagation process, the result of the previous step is used to correct a weight. Thus, the result of the output neuron correction is applied to a neuron that connects to the output neuron, and so forth until the input neurons are reached. Backpropagation has become a popular technique to train a variety of NNs. Any well-known optimization algorithm for back propagation may be used, such as stochastic gradient descent (SGD), Adam, etc.

Figure 8:
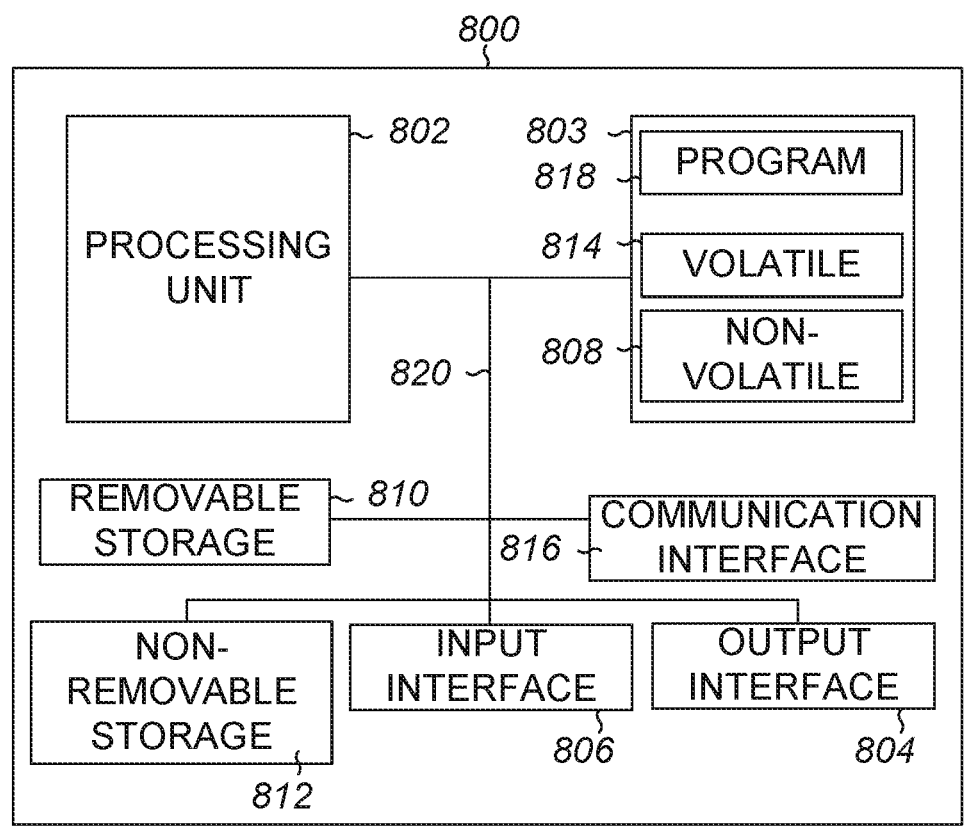
FIG. 8 illustrates, by way of example, a block diagram of an embodiment of a machine (e.g., a computer system) to implement one or more embodiments.

FIG. 8 illustrates, by way of example, a block diagram of an embodiment of a machine 800 (e.g., a computer system) to implement one or more embodiments. The machine 800 can implement a technique for secure cloud application provision, such as the method 700. The user device 102, network 104, cloud 106, or a component thereof can include one or more of the components of the machine 800. One example machine 800 (in the form of a computer), may include a processing unit 802, memory 803, removable storage 810, and non-removable storage 812. Although the example computing device is illustrated and described as machine 800, the computing device may be in different forms in different embodiments. For example, the computing device may instead be a smartphone, a tablet, smartwatch, or other computing device including the same or similar elements as illustrated and described regarding FIG. 8. Devices such as smartphones, tablets, and smartwatches are generally collectively referred to as mobile devices. Further, although the various data storage elements are illustrated as part of the machine 800, the storage may also or alternatively include cloud-based storage accessible via a network, such as the Internet.

Memory 803 may include volatile memory 814 and non-volatile memory 808. The machine 800 may include— or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

The machine 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via, wired or wireless data connections to the machine 800, and other input devices. The computer may operate in a networked environment using a communication connection to connect to one or more remote computers, such as database servers, including cloud-based servers and storage. The remote computer may include a personal computer (PC), server, router, network PC, a peer device or other common network node, or the like. The communication connection may include a Local Area Network (LAN), a Wide Area Network (WAN), cellular, Institute of Electrical and Electronics Engineers (IEEE) 802.11 (Wi-Fi), Bluetooth, or other networks.

Computer-readable instructions stored on a computer-readable storage device are executable by the processing unit 802 (sometimes called processing circuitry) of the machine 800. A hard drive, CD-ROM, and RAM are some examples of articles including a non-transitory computer-readable medium such as a storage device. For example, a computer program 818 may be used to cause processing unit 802 to perform one or more methods or algorithms described herein.

ADDITIONAL NOTES AND EXAMPLES

Example 1 includes a device comprising processing circuitry and a memory including instructions that when executed by the processing circuitry cause the processing circuitry to perform operations, the operations comprising receiving sampled network metadata of a packet transmitted via a computer network, providing the sampled network metadata to a neural network (NN) trained on labeled sampled network metadata, and providing, based on only the sampled network metadata, a classification for the sampled network metadata via the trained neural network.

In Example 2, Example 1 can further include, wherein the NN is trained further based on contents of the packet and the label is an actual classification associated with the contents of the packet and associated sampled network metadata.

in Example 3, Example 2 can further include, wherein the actual classification is determined using deep packet inspection.

in Example 4, at least one of Examples 1-3 can further include, wherein the NN is a recurrent NN.

In Example 5, at least one of Examples 1-4 can further include, wherein the NN includes a bi-directional long short term memory (LSTM) NN.

in Example 6, at least one of Examples 1-5 can further include, wherein the sampled network metadata is of network traffic provided over layer three of the computer network.

In Example 7, at least one of Examples 1-6 can further include, wherein the actual classification includes one of a user authentication, a device authentication, a database query, file transfer, data streaming, or a malicious action.

In Example 8, at least one of Examples 1-7 can further include, wherein the device is a router, switch, firewall, or client device.

Example 9 includes a method including operations or (non-transitory) machine-readable medium including instructions that, when executed by a machine cause the machine to perform the operations, the operations comprising receiving (at processing circuitry of a device) sampled network metadata of a packet transmitted via a computer network, providing (by the processing circuitry) the sampled network metadata to a neural network (NN) trained on labeled sampled network metadata, and providing, based on only the sampled network metadata, a classification for the sampled network metadata via the trained neural network.

In Example 10, Example 9 can further include, wherein the NN is trained further based on contents of the packet and the label is an actual classification associated with the contents of the packet and associated sampled network metadata.

in Example 11, at least one of Examples 9-10 can further include, wherein the actual classification is determined using deep packet inspection.

In Example 12, at least one of Examples 9-11 can further include, wherein the NN is a recurrent NN.

in Example 13, at least one of Examples 9-12 can further include, wherein the NN includes a bi-directional long short term memory (LSTM) NN.

In Example 14, at least one of Examples 9-13 can further include, wherein the sampled network metadata is of network traffic provided over layer three of the computer network.

In Example 15, at least one of Examples 9-14 can further include, wherein the actual classification includes one of a user authentication, a device authentication, a database query, file transfer, data streaming, or a malicious action.

Although a few embodiments have been described in detail above, other modifications are possible. For example, the logic flows depicted in the figures do not require the order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A device comprising:
    processing circuitry;
    a memory including instructions that when executed by the processing circuitry cause the processing circuitry to perform operations, the operations comprising:
    performing deep packet inspection on deep network information of network traffic, including a packet transmitted via a computer network, resulting in network metadata;
    sampling the network metadata to include data of a subset of the packets associated with the network metadata resulting in sampled network metadata;
    providing the sampled network metadata to a recurrent neural network (RNN) trained (i) on labeled sampled network metadata and the deep network information and (ii) to generate a classification based on only the sampled network metadata, the classification indicating whether the network traffic associated with the sampled network metadata is malicious;
    generating, by an analyzer and based on the classification for the sampled network metadata, an action, the action indicating an operation to mitigate malicious traffic associated with the sampled network metadata; and
    performing the action.

2. The device of claim 1, wherein the RNN is trained further based on contents of the packet and the label is an actual classification associated with the contents of the packet and associated sampled network metadata.

3. The device of claim 2, wherein the actual classification is determined using the deep packet inspection.

4. The device of claim 2, wherein the actual classification includes one of a user authentication, a device authentication, a database query, file transfer, data streaming, or a malicious action.

5. The device of claim 1, wherein the RNN includes a bi-directional long short term memory (LSTM) NN.

6. The device of claim 1, wherein the sampled network metadata is of network traffic provided over layer three of the computer network.

7. The device of claim 1, wherein the device is a router, switch, firewall, or client device.

8. A method comprising
    performing, by processing circuitry, deep packet inspection on deep network information of network traffic, including a packet transmitted via a computer network, resulting in network metadata;
    sampling the network metadata to include data of a subset of the packets associated with the network metadata resulting in the sampled network metadata;
    providing, by the processing circuitry, the sampled network metadata to a recurrent neural network (RNN) trained (i) on labeled sampled network metadata and the deep network information and the deep network information and (ii) to generate a classification based on only the sampled network metadata, the classification indicating whether the network traffic associated with the sampled network metadata is malicious;
    generating, by an analyzer and based on the classification for the sampled network metadata, an action, the action indicating an operation to mitigate malicious traffic associated with the sampled network metadata; and
    performing the action.

9. The method of claim 8, wherein the RNN is trained further based on contents of the packet and the label is an actual classification associated with the contents of the packet and associated sampled network metadata.

10. The method of claim 9, wherein the actual classification is determined using the deep packet inspection.

11. The method of claim 9, wherein the actual classification includes one of a user authentication, a device authentication, a database query, file transfer, data streaming, or a malicious action.

12. The method of claim 8, wherein the RNN includes a bi-directional long short term memory (LSTM) NN.

13. The method of claim 8, wherein the sampled network metadata is of network traffic provided over layer three of the computer network.

14. A non-transitory machine-readable medium including instructions that, when executed by a machine, cause the machine to perform operations comprising:
   performing deep packet inspection on deep network information of network traffic, including a packet transmitted via a computer network, resulting in network metadata;
   sampling the network metadata to include data of a subset of the packets associated with the network metadata resulting in the sampled network metadata;
   providing the sampled network metadata to a recurrent neural network (RNN) trained (i) on labeled sampled network metadata and (ii) to generate a classification based on only the sampled network metadata, the classification indicating whether the network traffic associated with the sampled network metadata is malicious;
   generating, by an analyzer and based on the classification for the sampled network metadata, an action, the action indicating an operation to mitigate malicious traffic associated with the sampled network metadata; and
   performing the action.

15. The non-transitory machine-readable medium of claim 14, wherein the RNN is trained further based on contents of the packet and the label is an actual classification associated with the contents of the packet and associated sampled network metadata.

16. The non-transitory machine-readable medium of claim 15, wherein the actual classification is determined using the deep packet inspection.

17. The non-transitory machine-readable medium of claim 14, wherein the RNN includes a bi-directional long short term memory (LSTM) NN.

* * * * *